United States Patent [19]
Wehrer

[11] Patent Number: 4,988,983
[45] Date of Patent: Jan. 29, 1991

[54] TOUCH ENTRY SYSTEM WITH AMBIENT COMPENSATION AND PROGRAMMABLE AMPLIFICATION

[75] Inventor: Wayne J. Wehrer, Austin, Tex.

[73] Assignee: Carroll Touch, Incorporated, Round Rock, Tex.

[21] Appl. No.: 240,168

[22] Filed: Sep. 2, 1988

[51] Int. Cl.⁵ .............. G06K 11/06; H03K 17/94
[52] U.S. Cl. ............................ 340/712; 341/31; 250/221
[58] Field of Search .......... 340/712, 706; 341/31; 250/221; 178/18

[56] References Cited

U.S. PATENT DOCUMENTS

| | | | |
|---|---|---|---|
| 4,243,879 | 1/1981 | Carroll et al. | 250/221 |
| 4,267,443 | 5/1981 | Carroll et al. | 250/221 |
| 4,591,710 | 5/1986 | Komandina et al. | 250/221 |
| 4,645,920 | 2/1987 | Carroll et al. | 250/221 |
| 4,684,801 | 8/1989 | Carroll et al. | 340/706 |
| 4,701,747 | 10/1989 | Isherwood et al. | 250/221 |

FOREIGN PATENT DOCUMENTS

0235459 9/1987 European Pat. Off. .
WO86/00446 1/1986 PCT Int'l Appl. .

Primary Examiner—Alvin E. Oberley
Attorney, Agent, or Firm—Robert W. Pitts

[57] ABSTRACT

A touch input device having infrared light beams defined by a plurality of pairs of light emitters and phototransistors is disclosed. A feedback loop containing a programmable amplifier is employed to compensate for the effects of ambient light and for device irregularities. The phototransistor current is first converted to a signal voltage by an operational amplifier and then is input into a low pass filter. The output of the lowpass filter is input into a feedback loop containing a summing amplifier, a programmable amplifier and an integrator. As light emitters and phototransistors are sequentially activated, the feedback loop with the programmable amplifier compares outputs signals in the unactivated state with those input when the light emitters are activated to compensate for ambient conditions and errors.

13 Claims, 12 Drawing Sheets

TOUCH ENTRY SYSTEM WITH AMBIENT COMPENSATION AND PROGRAMMABLE AMPLIFICATION

FIELD OF THE INVENTION

This invention relates to a touch entry system for detecting the presence of an element in an irradiated field and, more particularly, to a touch entry system and circuit for use in a touch entry system for detecting the intrusion and relative location of an element present within an irradiated field generally adjacent to an electronic display, in which the irradiated field is formed by a plurality of light emitters and light detectors.

BACKGROUND OF THE INVENTION

Along with the continued and increasing use of video displays has been the problem of the man/machine interface. Traditionally, control of displayed information or cursers has been via the use of a keyboard. More recently, however, a number of devices allow an operator to directly interact with a video display. These devices have included light pens, desk-type mouse controllers, or touch input devices, such as switch matrixes or opto-electronic matrices. While switch-type overlays, placed adjacent to a video display, are generally inexpensive to apply and to utilize, they are also susceptible to contact wear as well as the distortion of the video information which is presented to the viewer or operator, particularly in situations involving a high degree of use. Opto-electronic matrix schemes utilizing light which is generally in the infrared region, however, create a matrix which is invisible to the viewer or operator and, therefore, do not distort the video information displayed and is not subject to wear in high use environments. Systems utilizing opto-matrix frames are well known in the art. An example of such a system includes U.S. Pat. No. 4,267,443, entitled "Photoelectric Input Apparatus," issued May 12, 1981, to Carroll, et al.

Attendant to the use of such systems are problems such as increasing frame resolution without a corresponding increase in the number of components used, surrounding or ambient light compensation, and the optimization of emitter/detector driving and detecting networks. Such systems, however, still have certain drawbacks. For example, the use of a large number of components results in higher costs. Additionally, some systems exhibit difficulty in compensating for reflection or glare, which sometimes results in the failure of the system to detect a touch or hit.

It is generally desirable to have a touch entry system which minimizes the number of components necessary for addressing and sampling light emitters and light detectors. It is also desirable that the device dynamically compensate for ambient light effects and for variations in emitter light output and detector sensitivity. At the same time, however, the device should employ a minimal number of components. Accordingly, it is an object of the present invention to provide a touch entry system and circuitry for such a system which minimizes the number of components necessary for accurately addressing and sampling light detectors and light emitters surrounding an irradiated field.

Other ambient light compensation systems have required the use of large amounts of energy to drive light emitting devices, such as infrared light emitting diodes (LEDs), in order to ensure that the intensity of the light emitted by the LEDs is greater than the intensity of the ambient light. Such an approach requires the use of expensive light emitting and light detecting elements. Such an approach also requires that even high performance LEDs and phototransistors be operated outside normal operating ranges.

It is an object of the invention to provide a touch entry system and circuitry for such a system which utilizes a feedback loop which selectively holds the signal resulting from the ambient contribution at a preselected reference level to provide increased accuracy and confidence in the determination of the presence of an element in an irradiated field.

It is a still further object of the invention to provide a practical touch entry system and circuitry for such a system comprising a substantially rectangular frame with optical emitters and detectors disposed in the sides of the frame with a device for sequentially sampling and activating the light detectors and light emitters.

A still further object of the invention is to provide a cost effective touch entry system and circuitry for such a system to overcome ambient light problems in a touch entry system by utilizing and detecting light pulses.

It is a still further object of the invention to provide a touch entry system and circuitry for such a system which compensates for ambient light effects which is easily manufactured and produced with a minimum number of components and at a minimal cost.

U.S. Pat. No. 4,243,879 discloses a touch panel with ambient light sampling. This device includes sampling means for sampling the ambient output level of each of a plurality of light detectors. Storage means are employed to temporarily hold the signal representative of ambient light. Comparison is then made of the signal received from the same detector illuminated by a corresponding source of infrared light to detect the additional light. If no additional light is detected then a hit due to the presence of an opaque element blocking the infrared beam is detected.

The device employed in U.S. Pat. No. 4,243,879 does however have certain disadvantages which are not characteristic of the instant invention. It is difficult to conduct an accurate sampling with this prior art device. High precision resistors must be employed to subtract the ambient light signal from the activated signal. Therefore there are limits to the range of ambient light which can be handled because of the offsets and the errors in the subtraction make it easy to run up against a limit on the amount of ambient light which can be handled. With the instant invention, a servo loop is used to zero out the ambient. This servo loop is attached around the whole amplifier stage, all offsets and circuit resistor or capacitors type errors can be zeroed out. That allows compensation for all factors in a circuit in addition to ambient light. Therefore the amplifiers can be used at a much higher gain level than was possible with the prior art. This allows the front end to be set at a much lower gain, thereby giving a wider dynamic range to the ambient signal. The lower the gain on the front end, the more ambient light that can be handled. Signal swings at the front end can then be compensated by the servo loop containing a programmable amplifier according to the preferred embodiment of the invention. Previously sampling of the ambient and the activated signal was done before gain was applied and that required a comparison of two different resistor values in the prior art device disclosed in U.S. Pat. No. 4,243,879. Therefore any errors in the resistor value were exaggarated by the subsequent amplification of the signal. In the instant invention the baseline signal corresponding to the ambient signal is at ground which is where it should be for the analogue to digital converters employed in the touch input controller which comprises the preferred embodiment of this invention.

SUMMARY OF THE INVENTION

A touch input device for use with a visual display, such as a CRT screen used as an output device for a host computer is disclosed. The touch input device disclosed in the preferred embodiment of the invention thus permits input to the host computer by interaction with the visual display. The touch input device has a plurality of pairs of light emitters and light detectors, such as the light emitting diodes and phototransistors used in the preferred embodiment, which for light beams spanning the visual display. The emitters and detectors are sequentially actuated. The interruption of individual beams by an opaque stylus is detected by monitoring the output of the detector. This signal is fed to a feedback loop containing a programmable amplifier which can be set to account for the variability of components. A reference level can then be established when each light emitter is inactive so that signals induced by each light beam can be distinguished from signals due to ambient conditions and the variability of the components of the touch input device.

BRIEF DESCRIPTION OF THE DRAWINGS

FIG. 3 is a block diagram showing a system controller incorporating the preferred embodiment of this invention.

FIGS. 12 and 13 illustrate the output in various time expansions to show the behavior during various portions of the control cycle.

DETAILED DESCRIPTION OF THE PREFERRED EMBODIMENT

Figure 1:
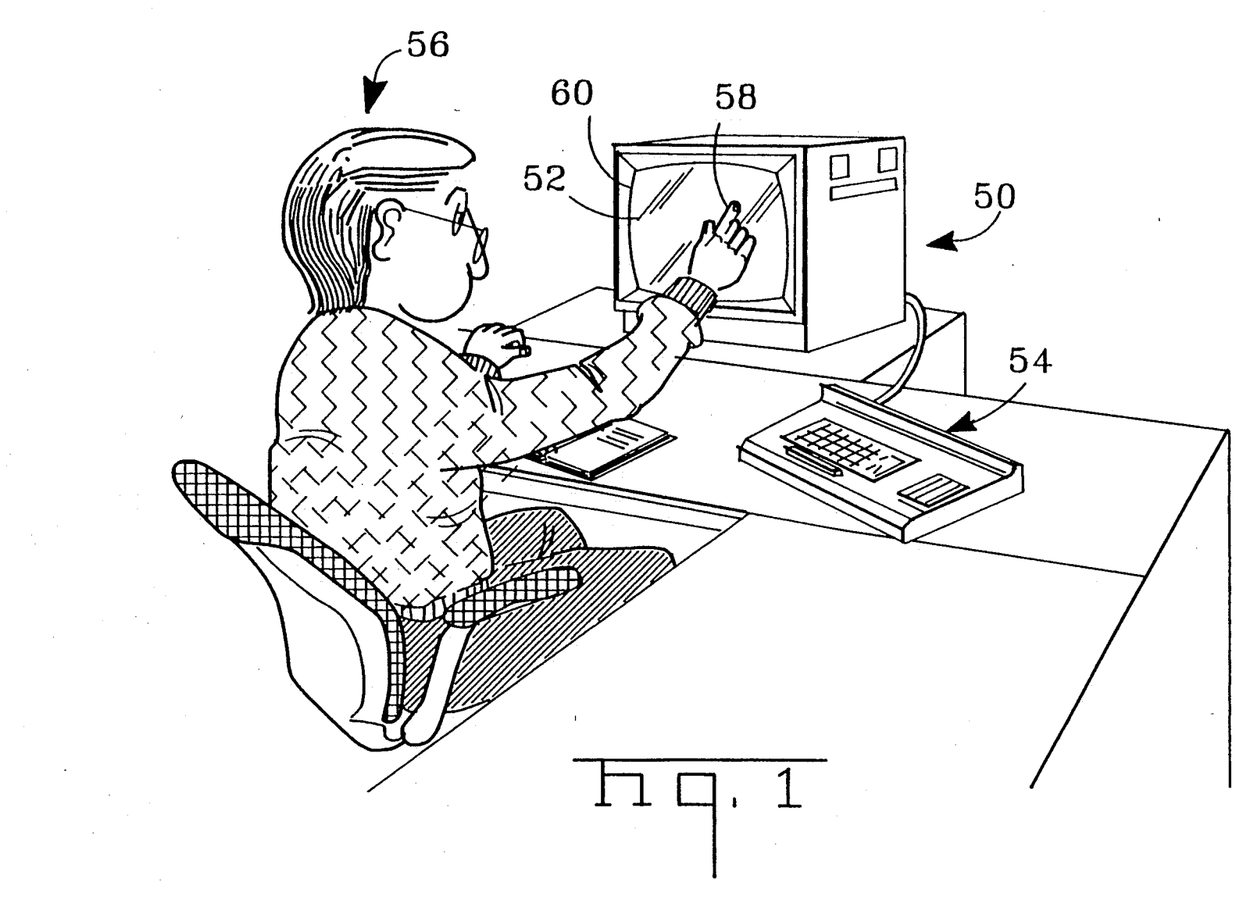
FIG. 1 shows the manner in which an operator interfaces directly with a visual display when a touch input device employing the present invention is employed.

FIG. 1 depicts the manner in which an operator can interact directly with information displayed on a CRT used in conjunction with a host computer such as a personal computer. The preferred embodiment of this invention is intended to provide real time inputs to a personal computer, such as an IBM PC. As such, this device comprises means for transmitting real time input information directly to the host computer. It should be understood, however, that this invention could be adapted to process input information which could then be input to the host computer through an RS232 interface in a conventional manner.

As shown in FIG. 1, an operator 56 can interact through a CRT 50 displaying information on a screen 52 simply by directly touching specific locations on the screen 52. Infrared light emitting diodes and detectors, such as phototransistors, could be mounted in a bezel or frame 60 located on the periphery of the display area 52 in a conventional manner such that a plurality of infrared beams would scan the display area 52. When the operator would place his finger 58 at a specific location on the display area 52, one or more infrared beams, extending between aligned emitters and detectors, would be interrupted. The unique location of the operator's finger 58 would then be transmitted to the host computer 70. More generally, this invention provides a means by which an opaque element, such as the operator's finger 58 or other styli, could be detected when disposed within an irradiated field, such as the display screen 52, formed by positioning light emitting devices, such as phototransistors, around the periphery of the irradiated field with the individual light emitting devices being aligned with corresponding individual light detecting devices.

Figure 2:
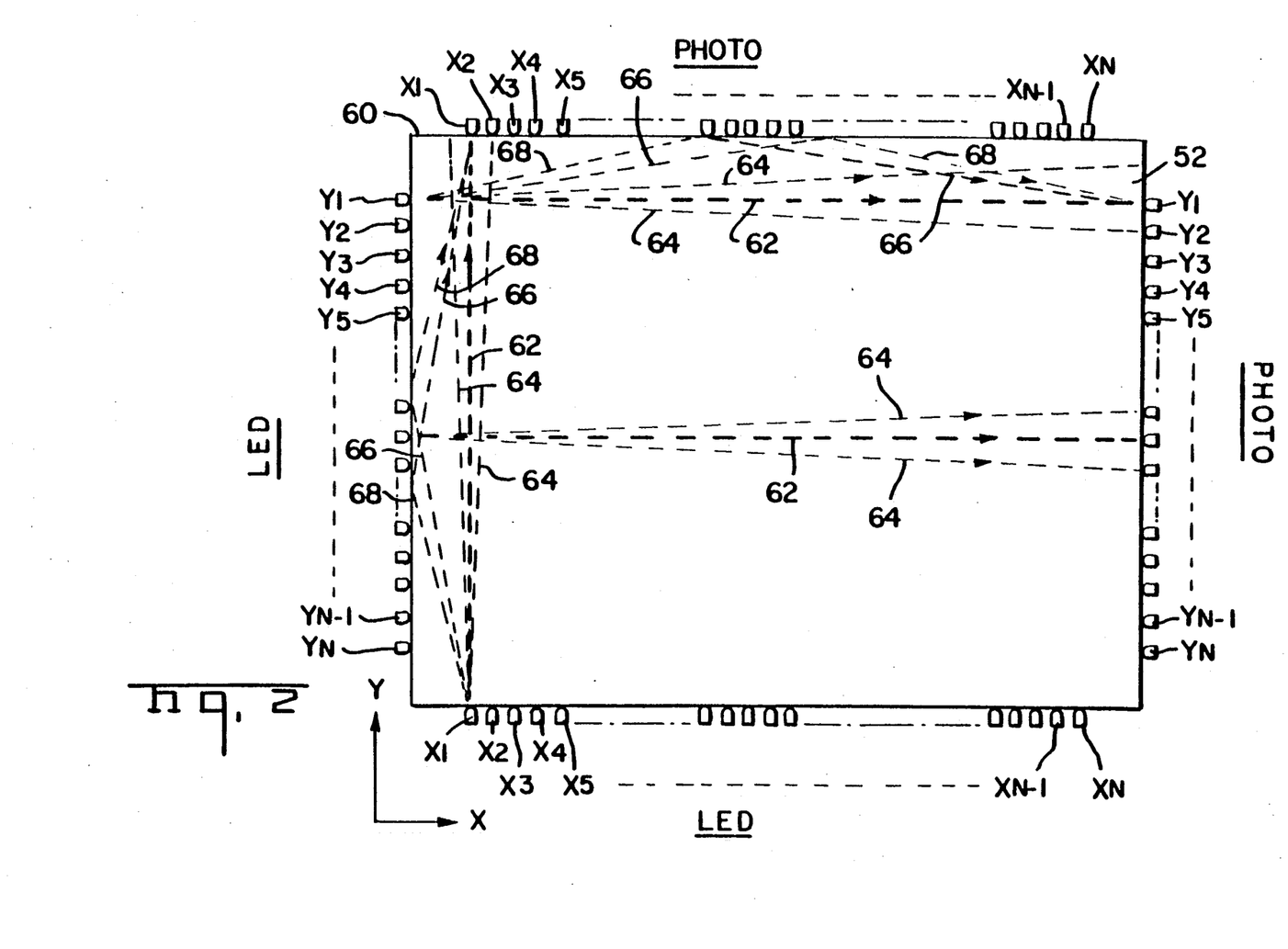
FIG. 2 shows the manner in which light emitting devices such as light emitting diodes and light detecting devices, in this case phototransistors, are disposed around the periphery of a visual display or irradiated field.

FIG. 2 shows arrays of light emitting devices and arrays of light detecting devices disposed around the periphery of an irradiated field 52. A touch input device, as depicted herein, when used with the display of a CRT, would be configured in this manner, with two orthogonal arrays of light emitting devices and two orthogonal arrays of photodetectors disposed along the sides of a rectangular display area 52. Light emitting diodes and phototransistors are commonly used for such touch input systems, although it should be understood that other light emitting devices and light detecting devices could be suitably employed. As shown herein, a Y array of light emitting diodes (LED's), $Y_1$ thro $Y_N$, are located along the left of the frame 60 surrounding the display area or irradiated field 52. A similar array of light emitting diodes, $X_1$ through $X_N$, is located along the bottom of the frame 60. Arrays of phototransistors, $Y_1$ through $Y_N$, located along the top of the frame 60 are disposed such that individual corresponding LED's and phototransistors, such as $X_1$—$X_1$ and $X_2$—$X_2$ and $Y_1$—$Y_1$ and $Y_2$—$Y_2$, are aligned. Thus, when light is emitted by an individual light emitting device, such as $X_1$, this light will be incident upon a corresponding aligned phototransistor $X_1$. FIG. 2 shows, however, that the light emitted by individual LED's or other light emitting devices is incident not only upon the corresponding aligned photodetector but is also incident upon adjacent photodetectors. Note that while the light emitted along centerline 62 between emitter-detector pairs $X_1$ will be incident on detector $X_1$, light emitted along line 64, within the dispersion angle of conventional light emitting devices, will be incident upon adjacent phototransistor $X_2$. Light indicated at 66 and 68 might also be incident upon sides of the frame 60 causing certain glare and refection problems in practical touch input systems. A common method of ensuring that light emitted by a given light emitting device is detected only by the corresponding light detecting device or phototransistor, $X_1$—$X_1$, and not by an adjacent light detecting device such as $X_2$, is to sequentially activate light emitting devices and sequentially scan the arrays of phototransistors. In other words, when a given light emitting device is activated and emits light, only the aligned phototransistor, and adjacent phototransistors, is activated. Thus, activation of light emitting diode $X_1$ would occur at the same time that phototransistor $X_1$ is activated to detect incident light. The adjacent phototransistor $X_2$, upon which light from LED $X_1$ would also be incident, would not be turned on during the interval in which LED $X_1$ is activated. Note that this sequential activation of light emitting diodes and phototransistors permits accurate detection of the presence of an opaque element positioned between aligned LED's and phototransistors. The light from an adjacent LED, which is not blocked by an opaque element disposed in the field, will not activate a "blocked" phototransistor simply because that LED will not be turned on during the activation interval of the "blocked" phototransistor. This sequential activation of light emitting devices and light detecting devices is achieved by conventional multiplexing techniques with scan rates of at least 20 scans per second.

The block diagram of FIG. 3 shows the essential elements of the controller used to activate individual light emitting diodes and individual phototransistors in a scanning mode and to detect and process the output signals from the phototransistors and compensate for the effect of ambient light detected by the phototransistors during the scanning cycle. The various components which are part of this system controller are in turn under the control of the 8OC31 microprocessor 101. The 2764 EPROM is an electrically programmable read only memory that contains the system operating code. As such it constitutes the firmware for the system. Variables for a particular system would be stored in the 6234 random access memory 103. In the preferred embodiment of the invention, communication between the microprocesser 101 and the EPROM 102 is facilitated by the 74HC373 which is used to demultiplex the multiplexed address/data bus of the microcontroller used herein. The 93C46 Electrically Erasable Programmable Read Only Memory 104 is used to provide individual customization of the circuitry for different size products by loading parameters into this EEPROM 104. Examples of parameters loaded include the X- and Y-axis number of opto device pairs and system gain levels.

Communication between the LED and Phototransistor Arrays and the microprocessor 101 is accomplished over bus 105 and through the 74HC377 eight bit register 106. The LED's are activated by the 2585 driver 107 through the 74HC138 three line to eight line decoder 108 and the 74LS145 driver 109. The Photos transistors are activated by the 4051 driver 110 and the 74LS145 driver 111.

Figure 4A:
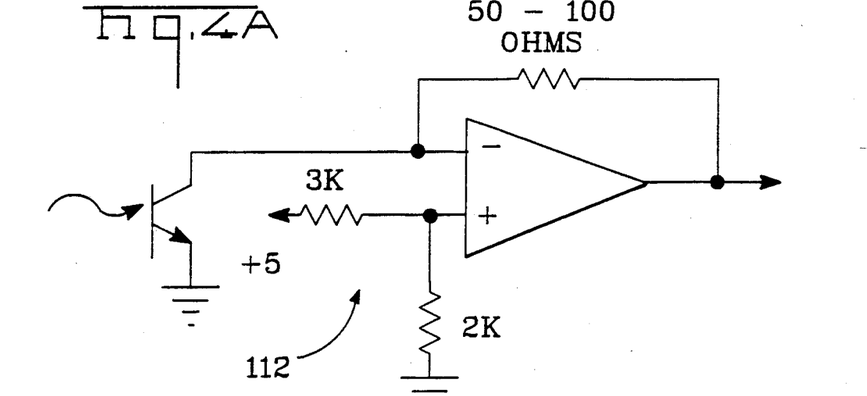
FIG. 4A shows an op-amp based photocurrent to voltage converter used to interface with the phototransistors.

Output signals from both the X and Y arrays of Phototransistors are interfaced through an op-amp based photocurrent to voltage converter 112 shown in more detail in FIG. 4A. The single op-amp 112 is sequentially connected with each individual phototransistor during the phototransistor scanning cycle. This interface provides relatively low operating impedance, good noise performance, and constant phototransistor operating voltage for good device matching. The relatively low operating impedance is obtained by virtue of the fact that the collector of the phototransistor drives the virtual ground input of the operational amplifier. Power supply noise rejection is good because this configuration takes advantage of the common mode rejection ratio of the op amp. In the preferred embodiment depicted herein, a constant phototransistor collector to emitter voltage results from the biasing of the op amp, in that the negative input is held by the closed loop feedback to be equal to the 2 volts on the positive input. The feedback resistor on the current to voltage converter is kept low to keep swings of voltage due to high ambient light on the phototransistor from saturating the output of the op amp. These swings in voltage are compensated for later in the signal processing chain.

Figure 4B:
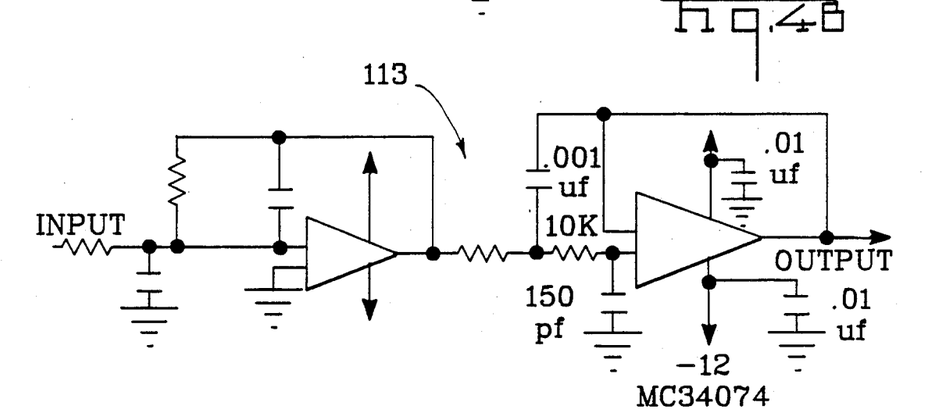
FIG. 4B shows a low pass filter used in the preferred embodiment of the invention.

The output of the op-amp based photocurrent to voltage convertor 112 next passes through a low pass filter 113. In the preferred embodiment of the invention, a fourth order low pass filter as shown in FIG. 4B is used to reduce the effects of interfering RFI noise. This filter was included to allow reliable operation on electrically noisy plasma displays. It is designed to severely limit high frequencies while maintaining the pulse shape of the touch signals. The use of an RFI shield for operation in close proximity to plasma panels is recommended. In the preferred embodiment of the invention the pass frequency is limited to about 15 KHz. Depending on the operational environment, this filter could be reduced to a second order low pass filter if noise levels permit.

After the touch signals pass through the low pass filter 113, compensation for ambient light effects and amplifier offsets is provided in the chopper stabilized, ambient light compensating programmable gain amplifier, or servo amp, stage 114. This closed loop servo amp 114 is shown in more detail in FIG. 5. The signal from low pass filter 113 is first input into a summing amp 115 which subtracts the feedback signal from the input signal while at the same time applying a gain factor to both signals. The signal is then input into a programmable amplifier 116 connected to the output of the summing amp 115 within the feedback loop. The total gain of the circuit is then the product of the gain of the summing amp and the current setting of the programmable gain amp 116. The manner of setting the gain of the programmable gain amp 116 will be discussed with reference to FIG. 6.

Figure 5:
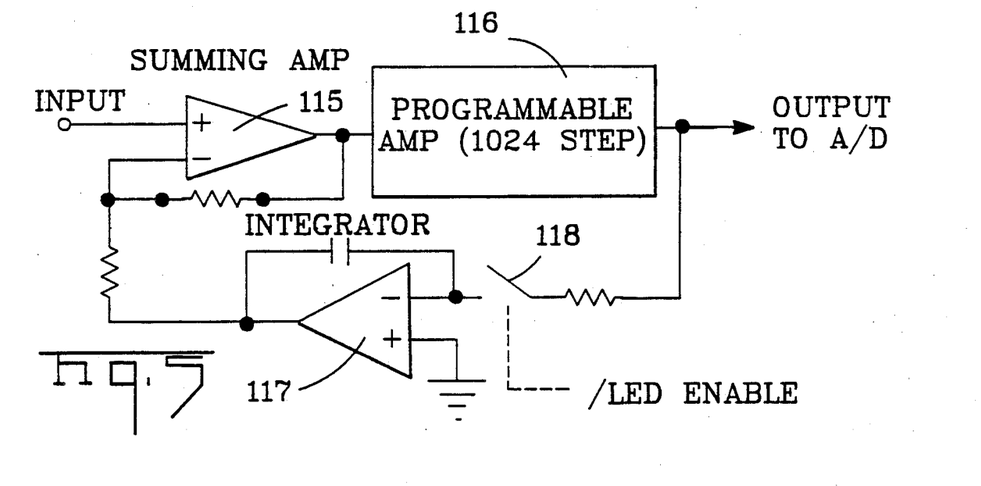
FIG. 5 shows a chopper stabilized, ambient light compensating programmable gain amplifier circuit or servo amp which is used to cancel ambient light effects.

The feedback loop is closed during all times in which an LED is not activated. During this time the integrator 117 acts in the closed loop to drive the output to the A/D converter to zero volts independent of the input voltage and vaiations in the amplifier offset voltages. During the time when the LED is activated, the switch 118 controlled by the /LED ENABLE is opened. During this time the integrator 117 acts as a hold circuit to maintain the last corrected value. No additional corrections to the amplifier operations are made during this time such that the signal produced by the LED passes through the summing and programmable gain amplifiers unmodified. The baseline correcton results in an ideal reference level for the A/D which reads the LED signal. The configuration allows for individual correction (without firmware overhead) for each opto pair independently allowing for variations in ambient signal from device to device.

Figure 6:
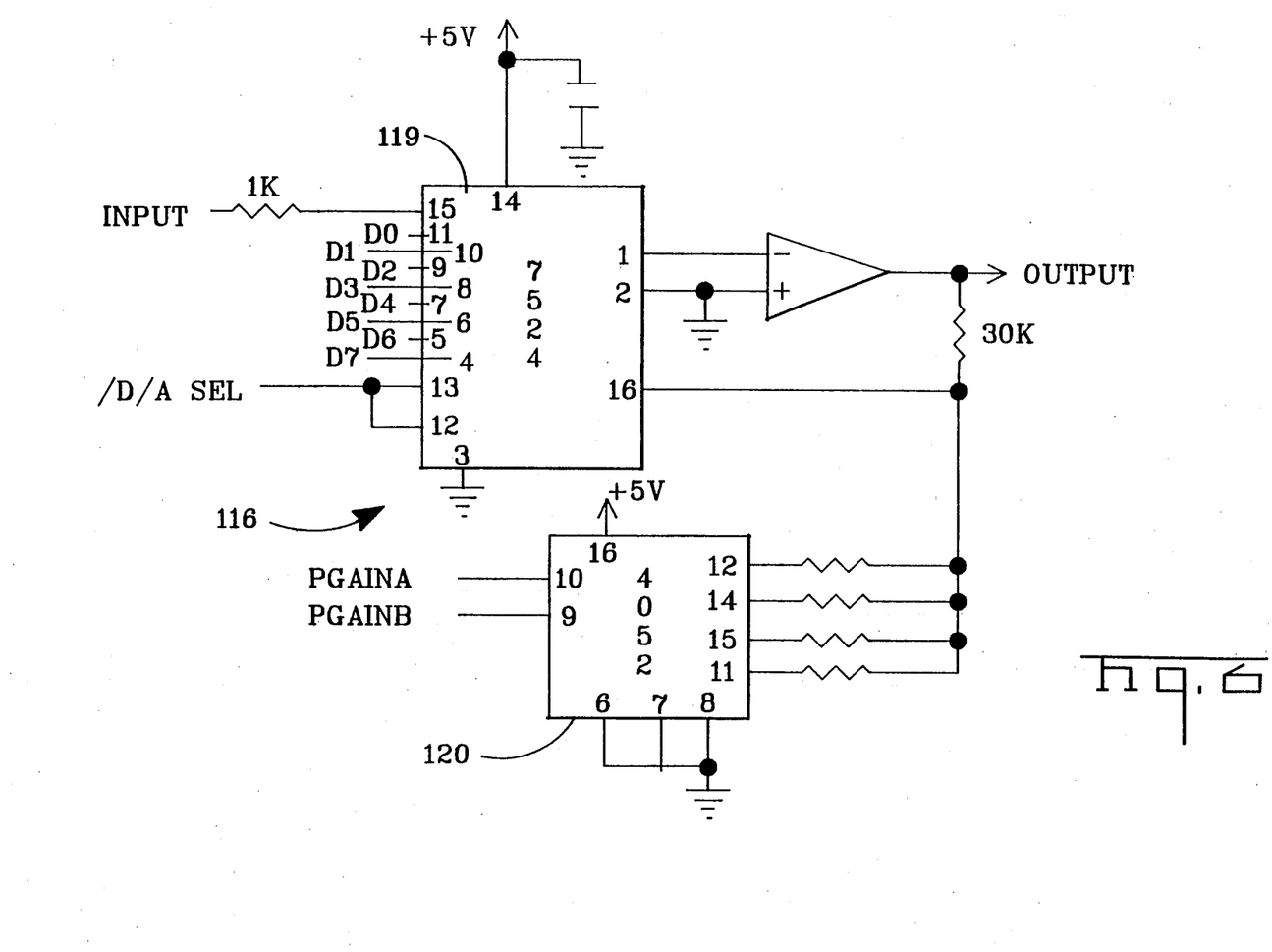
FIG. 6 shows a programmable gain amplifier employed herein.

FIG. 6 is a detailed drawing of the programmable gain amplifier used in the preferred embodiment of the invention. This amplifier 116 can be set to 256 individual gain setting in each of four gain step sizes. A 7524 digital to analog (D/A) convertor 119 is used as the control element to produce the 256 steps. The reference voltage input of the D/A is used as the input for the touch signals. The 4052 analog switch is used to change the overall gain of the element in four different settings. The equation for the circuit transfer is:

OUTPUT = (30000/4700 + 1) * (D/A Set Value/256)

assuming that a 4700 ohm resistor has been selected with the 4052 analog switch 120.

The software selectable step size control has been added to the 256 programmable gain step primary element to allow a wider possible application of this controller. This four step control provides optimal positioning of the 256 step element thus conserving dynamic range. It is used to adjust for frame size and differences between the X and Y dimension. The step size is selected through the microcontroller applied values PGAINA and PGAINB.

The voltage applied to the TLC549 analog to digital (A/D) converter 121 is switched between the output of the programmable amp 116 and the first stage output of the signal processing chain. This allows measurement of the actual ambient condition such that excessive light conditions may flag invalid touch measurements. The output of the A/D converter 121 is then transmitted through a 74HC299 serial to parallel converter 122 to bus 123 and thus to the microprocessor 101. The sequential signals from the individual phototransistors, responsive to the activation of corresponding light emitting diodes, have sequentially passed through the the same chopper stabilized, ambient light compensating programmable gain amplifer which preconditions the signals for individual opto-device beam pairs as described in U.S. Pat. No. 4,684,801, which is incorporated herein by reference. Valid touch input signals corresponding to the interruption of individual beams by an opaque element can now be detected by the microprocessor and a signal providing this input information can now be supplied to the host computer.

Figure 7:
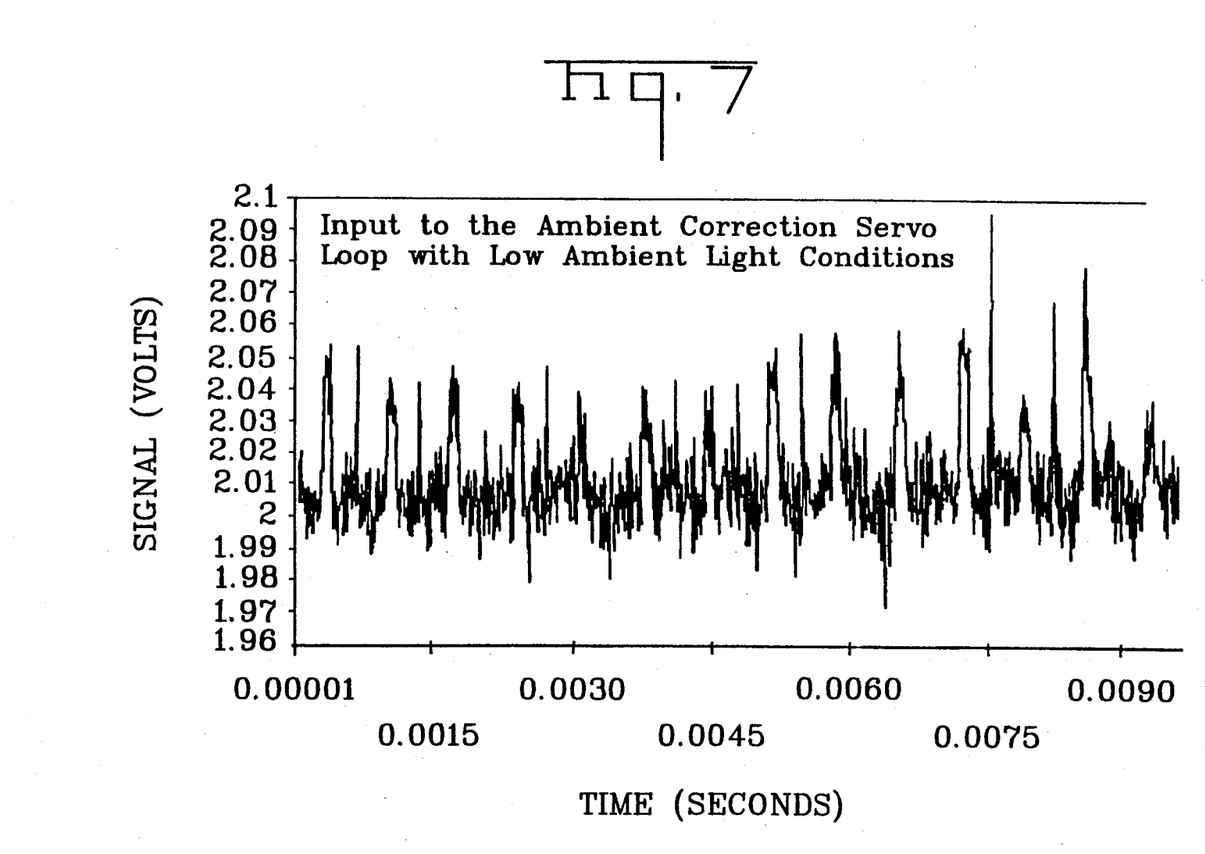
FIGS. 7 and 8 are captured scope signals of the signal input to the servo amp for two different ambient light conditions.
Figure 8:
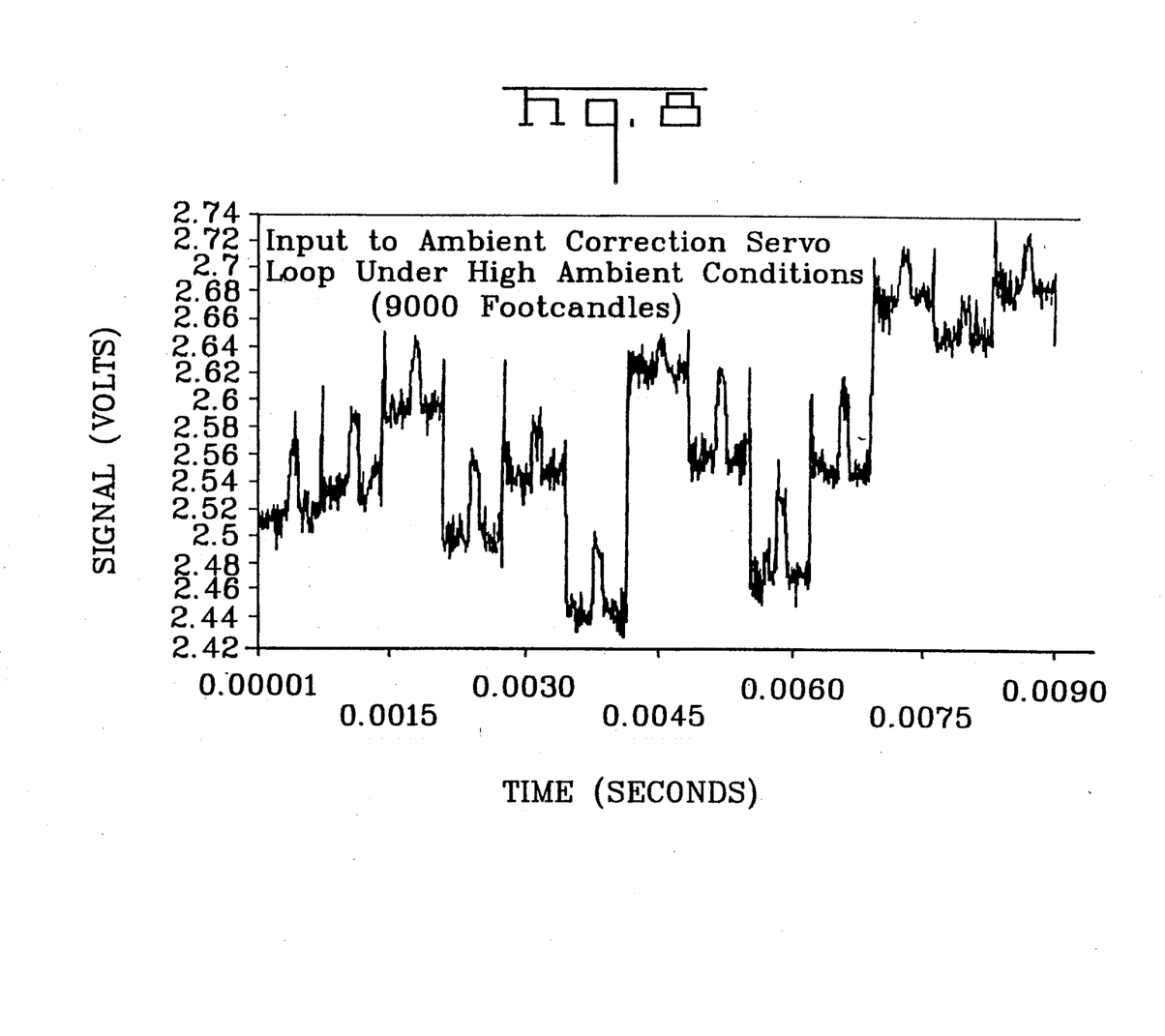
Figure 9:
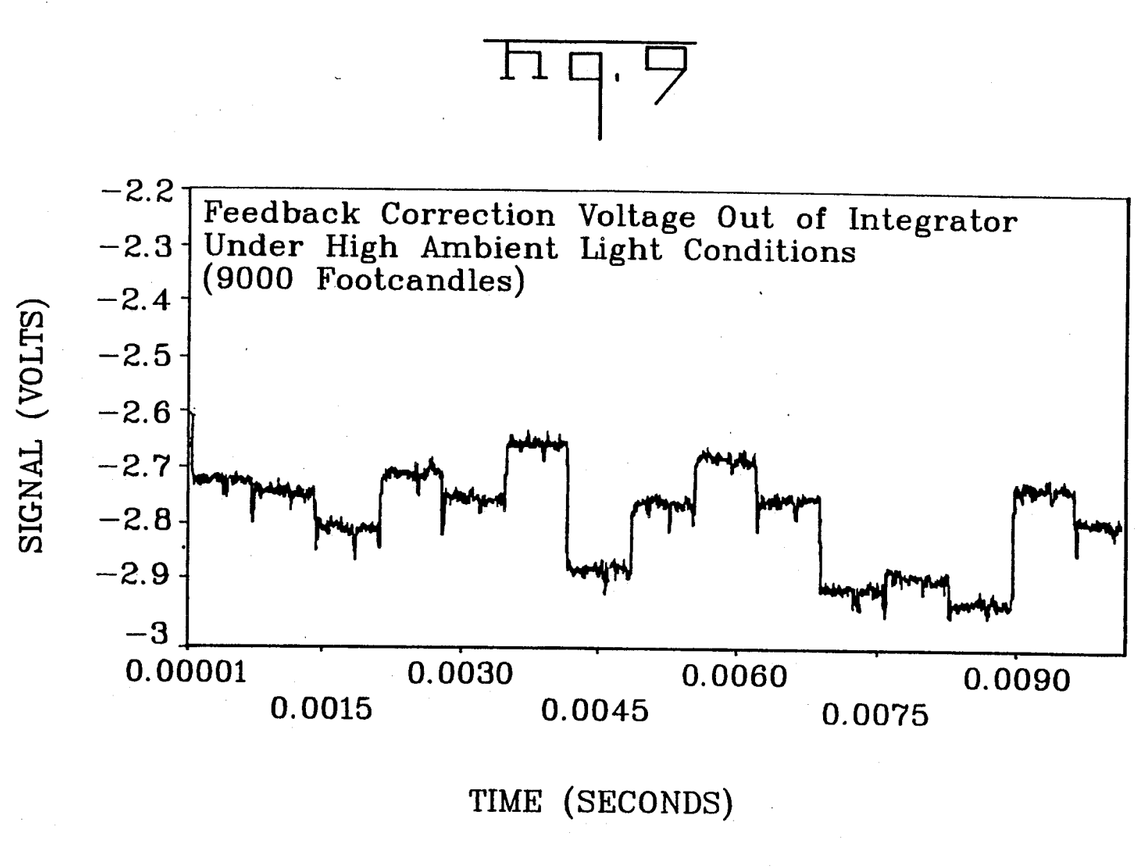
FIG. 9 illustrates the feedback voltage at the output of the integrator for the high ambient light condition shown on the signals of FIG. 8.
Figure 10:
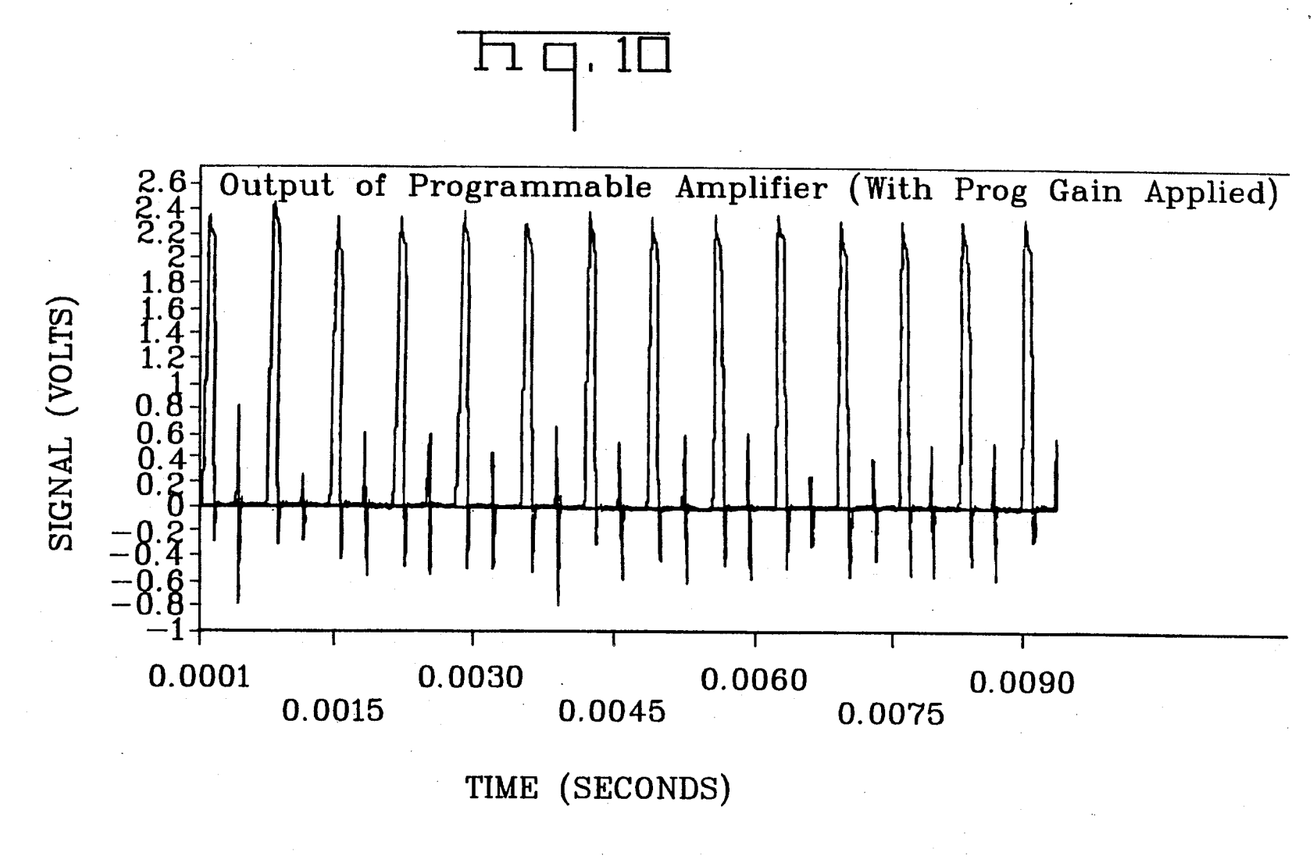
FIGS. 10 and 11 detail the output of the programmable amplifier with and without programmable gain control.
Figure 11:
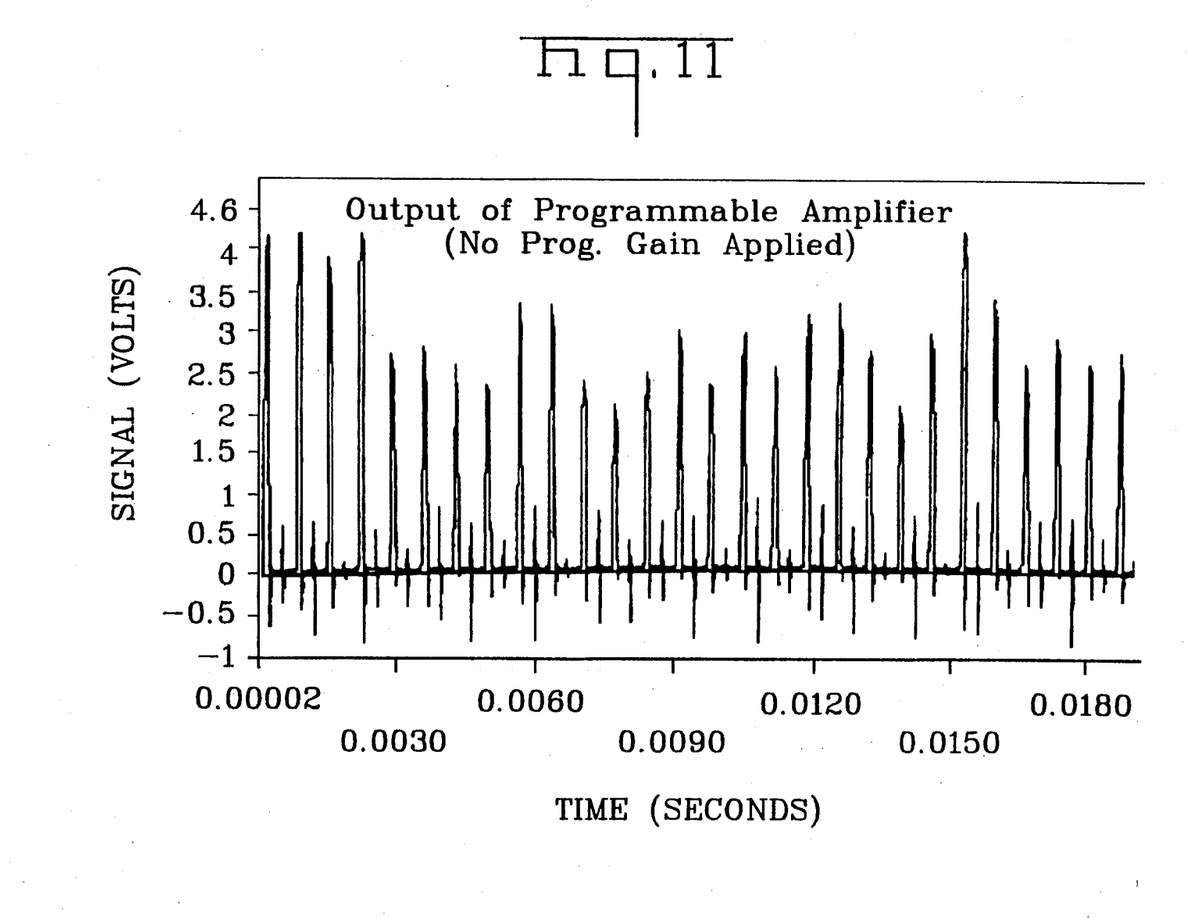
Figure 12:
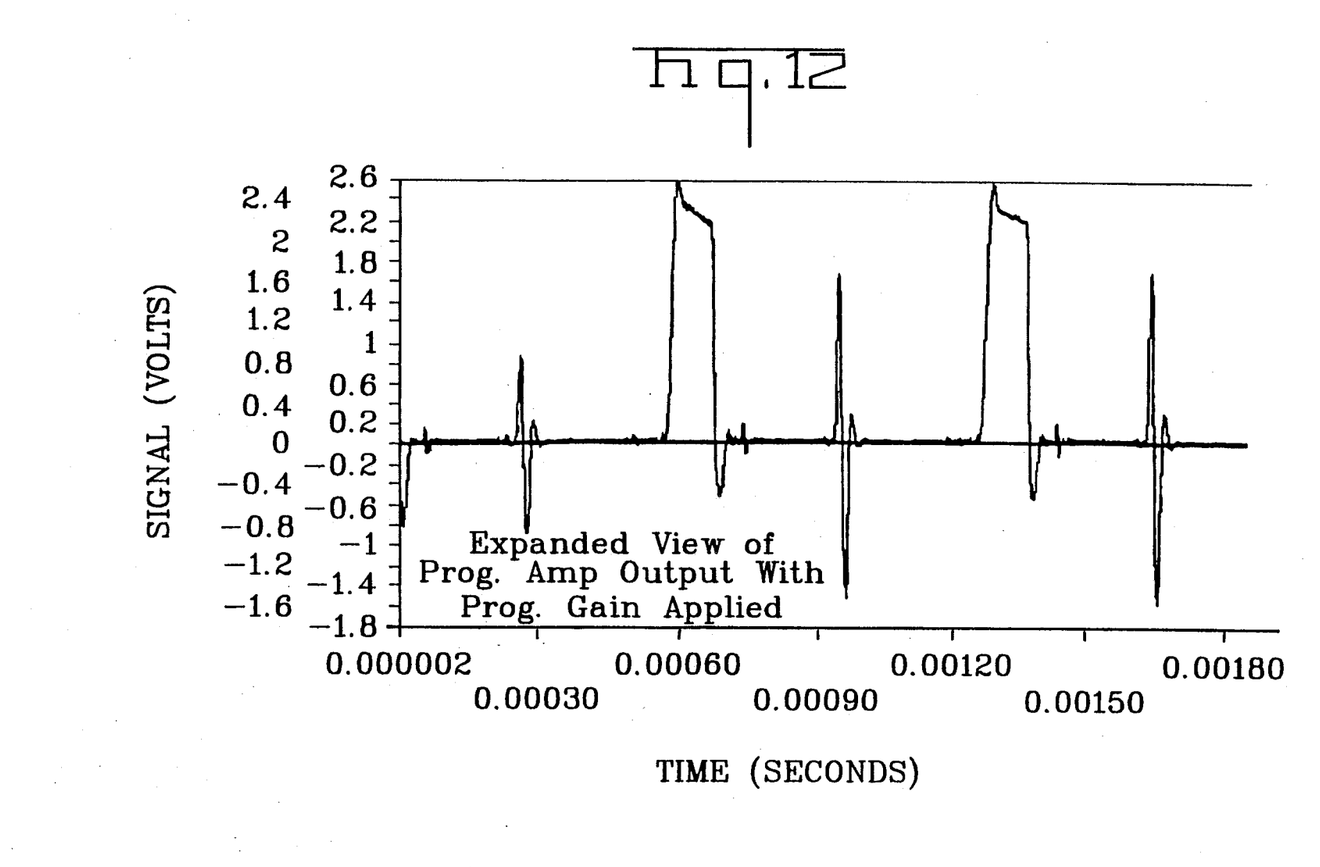
Figure 17:
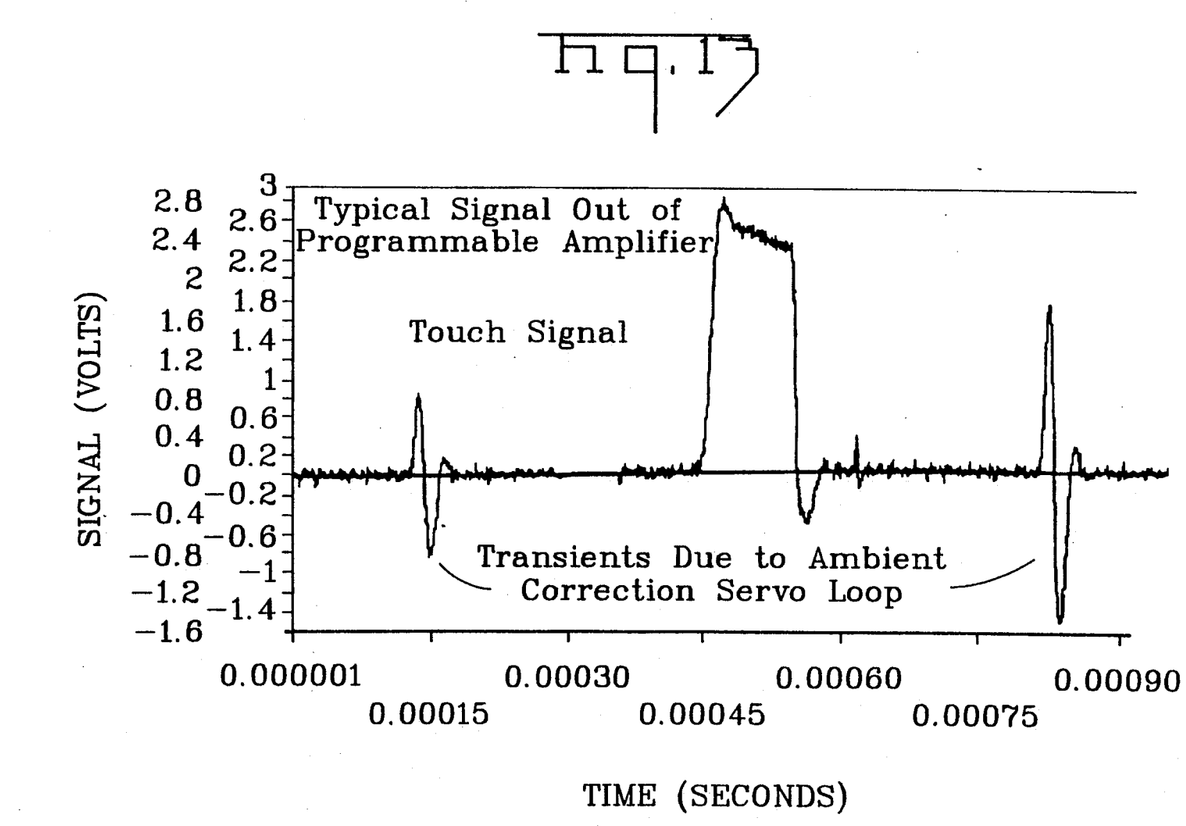

FIGS. 7–13 depict signals which demonstrate the manner in which compensation for ambient light and other ambient variables and noise can be made. FIGS. 7 and 8 are captured oscilloscope measurements of the signal input to the servo-amp for two different ambient light conditions. FIG. 7 is for a low ambient condition while FIG. 6 if for a high ambient condition (9000 footcandles). The abscissa is time and the elapsed time corresponds to the activation of a number of opto device pairs. The DC difference due to ambient conditions between opto pairs is apparent at high ambient. FIG. 9 illustrates the feedback voltage at the output of the integrator 177 for the high ambient light condition shown in FIG. 8. This feedback signal is then applied to the summing amp 115 to compensate for ambient conditions. FIGS. 10 and 11 detail the output of the programmable amplifier 116 with and without the application of programmable gain. FIG. 10 shows that by the application of programmable gain the output due to the detection of an infrared beam, in other words the beam is not interrupted by the presence of an opaque element within the irradiated field or at the visual display. When compared with the output from the programmable amplifier without programmable gain it is clear that the output signals for different phototransitors are substantially constant in spite of variations due to ambient conditions and due to optodevice differences. FIGS. 12 and 13 illustrate this output in various time expansions to better record the behavior during various portions of the control cycle. FIG. 13 clearly demonstrates both touch signals and transients due to the ambient correction servo loop.

What is claimed is:

1. A touch input device for use with a visual display, comprising:
    a plurality of paris of light emitters and light detectors forming light beams spanning the visual display;
    means for intermittently activating corresponding emitters and detectors forming individual light beams; and
    means for detecting the interruption of individual light beams, further comprising a feedback loop containing a programmable amplifier, a summing amplifier and an integrator, the programmable amplifier having a unique amplification ratio for each detector and being sequentially responsive to signals detected by each detector during a time interval greater than the time during which the corresponding emitter is activated, output from the programmable amplifier establishing a constant reference level independent of signals output by an activated detector, during a portion of the time interval during which the corresponding emitter is inactive, the signal induced in each detector from the corresponding emitter resulting in an output level from the programmable amplifier exceeding the reference level, so that signals induced by each light beam can be distinguished from signals due to ambient conditions and the variability of the components of the touch input device.

2. The touch input device of claim 1 wherein the signals detected by each detector comprise a phototransistor current, the phototransistor current being converted to a corresponding signal voltage output from an operational amplifier for input into the feedback loop, the operational amplifier being biased to maintain a constant phototransistor collector to emitter voltage.

3. The touch input device of claim 2 wherein the signal voltage is input into a low pass filter before input into the feedback loop.

4. The touch input device of claim 1 wherein the feedback loop is closed at all times when a light emitter is not activated.

5. A light detector signal detection circuit which comprises:
    first means for generating a first signal corresponding to the incidence of light upon a light detector and providing an output thereof;
    second means responsive to said signal first means for amplifying said first signal;
    programmable amplification means responsive to said signal amplifying means, to a microprocessor control unit, and to a feedback loop including said programmable amplification means, a summing amplifier and an integrator, for selectively amplifying said first signal, wherein said programmable amplification means comprises a stepwise programmable amplifier and provides an output signal, wherein said feedback loop is responsive to said output signal and to a second signal indicating the activation of a light emitter so that, when said second signal fails to indicate the activation of a light emitter, said feedback loop is closed and said output signal of said programmable amplification means is driven to a predetermined value.

6. A circuit according to claim 5, wherein said stepwise programmable amplifier comprises:
   a digital to analog converter responsive to said first means and to said microprocessor control unit;
   an analog switch response to said microprocessor control unit; and
   at least one resistor responsive to a signal from said analog switch, wherein said signal from said analog switch is connected to an output signal of said digital to analog converter.

7. A circuit according to claim 5, wherein said first means includes:
   means responsive to said light detector for converting a current signal to a voltage signal; and
   means responsive to said converting means for filtering said voltage signal and providing an output thereof.

8. A circuit according to claim 5 further comprising:
   switching means responsive to said output signal of said programmable amplification means, said first means, and to a control signal; and
   analog to digital conversion means responsive to said switching means for converting a signal to digital form and providing an output thereof, said switching means connecting said output signal of said programmable amplification means to said analog to digital conversion means in a first position and, said switching means connecting said output of said first means to said analog to digital conversion means in a second position.

9. An input detection apparatus for detecting the presence of an element in an irradiated field having a periphery which comprises:
   an array of a plurality of light emitters and a plurality of light detectors disposed on the periphery of the irradiated field, wherein said light emitters and said light detectors are aligned so that for each light emitter there is at least one corresponding light detector;
   means for selectivity activating said light emitters and said light detectors so that, when a particular light emitter and said corresponding light detector are activated, said light detector will generate a first signal;
   signal conditioning means responsive to said light detectors for conditioning said first signal and providing an output corresponding to the amount of light incident of said light detector;
   programmable amplification means responsive to said signal conditioning means and to a control unit, and to feedback loop, for selectively amplifying said first signal and providing an output signal thereof,
   wherein said programmable amplification means comprises a stepwise programmable amplifier and wherein said feedback loop comprises means, responsive to said programmable amplification means and to said means for selectively activating said light emitters and said light detectors, for holding said output signal of said programmable amplification means substantially at a pre-selected reference level when no light emitter is activated so that, when a light emitter is activated, said output signal of said programmable amplification means differs from said reference level, said feedback loop also including a summing amplifier and an integrator; and
   detecting means responsive to said output signal of said programmable amplification means for detecting an element's presence in the irradiated field.

10. An input detection apparatus according to claim 9, wherein said control unit comprises a microprocessor.

11. An input detection apparatus according to claim 9, wherein said stepwise programmable amplifier comprises:
   a digital to analog converter responsive to said signal conditioning means and to said control unit;
   an analog switch responsive to said control unit; and
   at least one resistor responsive to a signal from said analog switch, wherein said signal from said analog switch is responsive to an output signal of said digital to analog converter.

12. An input detection apparatus according to claim 9, wherein said signal conditioning means comprises:
   means responsive to said light detectors for converting current signal to a voltage signal; and
   means responsive to said converting means for filtering said voltage signal and providing an output signal thereof.

13. An input detection apparatus according to claim 9 further comprising:
   switching means responsive to said output signal of said programmable amplification means, said signal conditioning means, and to a control signal from said control unit; and
   conversion means responsive to said switching means for converting a signal from analog to digital form and providing an output thereof, wherein when said control signal is in a first state, said switching means provides said output signal of said programmable amplification means to said conversion means and, when said control signal is in a second state, said switching means provides said output of said signal conditioning means to said conversion means.

* * * * *